United States Patent
Chambard et al.

(10) Patent No.: US 9,593,726 B2
(45) Date of Patent: Mar. 14, 2017

(54) DISC BRAKE FOR AN AIRCRAFT WHEEL

(71) Applicant: MESSIER-BUGATTI-DOWTY, Velizy-Villacoublay (FR)

(72) Inventors: Pierre Chambard, Velizy-Villacoublay (FR); Come Dorge, Clamart (FR); Richard Masson, Les Loges En Josas (FR); Jean-Baptiste Vaney, Velizy-Villacoublay (FR)

(73) Assignee: MESSIER-BUGATTI-DOWTY, Velizy-Villacoublay (FR)

(*) Notice: Subject to any disclaimer, the term of this patent is extended or adjusted under 35 U.S.C. 154(b) by 0 days.

(21) Appl. No.: 14/691,825

(22) Filed: Apr. 21, 2015

(65) Prior Publication Data
US 2015/0337915 A1 Nov. 26, 2015

(30) Foreign Application Priority Data
May 21, 2014 (FR) ...................................... 14 54575

(51) Int. Cl.
*F16D 55/42* (2006.01)
*B64C 25/44* (2006.01)
*F16D 55/24* (2006.01)
*F16D 55/36* (2006.01)
*F16D 55/00* (2006.01)

(52) U.S. Cl.
CPC .............. *F16D 55/42* (2013.01); *B64C 25/44* (2013.01); *F16D 55/24* (2013.01); *F16D 55/36* (2013.01); *F16D 2055/0058* (2013.01); *F16D 2055/0095* (2013.01)

(58) Field of Classification Search
CPC .......... F16D 55/02; F16D 55/24; F16D 55/42; F16D 55/26; F16D 55/36; F16D 55/38; F16D 2055/0091; F16D 2055/0095; B64C 25/44
See application file for complete search history.

(56) References Cited

U.S. PATENT DOCUMENTS

| | | | |
|---|---|---|---|
| 3,480,115 A | 11/1969 | Lallemant | |
| 2005/0115778 A1* | 6/2005 | Chico | F16D 55/36 188/72.1 |
| 2007/0084677 A1* | 4/2007 | Thibault | B60T 13/74 188/71.5 |
| 2009/0152394 A1* | 6/2009 | Frank | B64C 25/44 244/58 |
| 2012/0153753 A1* | 6/2012 | Hanlon | F16D 65/14 310/77 |
| 2013/0299286 A1* | 11/2013 | Tanty | B64C 25/42 188/71.5 |

* cited by examiner

*Primary Examiner* — Vishal Sahni
(74) *Attorney, Agent, or Firm* — Sughrue Mion, PLLC

(57) ABSTRACT

The invention relates to a disc brake for an aircraft wheel, comprising friction discs (20,30), including rotor discs and stator discs, a structure comprising a torsion tube (11) on which the discs are fitted, a rear plate (12) which is located at one end of the tube, and a support (13) for braking actuators (14,15) at another end of the tube, the actuators being able to be selectively activated in order to apply a pressing force to the discs. According to the invention, the discs are separated into two groups, including a first group (20) which can be used alone for taxiing braking operations, and a second group (30) which can be used alone or in conjunction with the first group for take-off/landing braking operations.

10 Claims, 2 Drawing Sheets

DISC BRAKE FOR AN AIRCRAFT WHEEL

TECHNOLOGICAL BACKGROUND OF THE INVENTION

Aircraft wheel brakes of a specific size generally comprise a stack of discs comprising, alternately, stators which do not rotate with the wheel and rotors which rotate with the wheel. The discs are arranged between a rear support and one or more actuators which selectively press the discs one against the other in order to generate a resisting torque, which brings about a deceleration of the wheel, and thus contribute to braking the aircraft.

The stack of discs is generally sized in order to ensure braking of the aircraft in the event of a situation involving an aborted take-off at full thrust. This event, which is very exceptional in the life of an aircraft, leads to the multiplication of the number of discs in order to provide a sufficient number of frictional interfaces, and to provide a significant thickness of the stack of discs. The heat sink constituted by the discs is thus oversized for the common braking actions. Furthermore, the multiplication of the number of discs impairs the service-life of the discs, the wear being even greater when the number of frictional faces is large.

SUBJECT-MATTER OF THE INVENTION

The invention relates to an aircraft wheel disc brake which is capable of ensuring any type of braking, including during a situation involving interrupted take-off at full thrust, without comprising oversized discs.

STATEMENT OF INVENTION

In order to achieve this objective, there is proposed a disc brake for an aircraft wheel, comprising:
friction discs including rotor discs and stator discs;
a structure which comprises a torsion tube on which the discs are fitted, a rear plate which is located at one end of the tube, and a support for braking actuators at another end of the tube, the actuators being activable in order to selectively apply a pressing force to the discs.
According to the invention, the discs are separated into two groups, including a first group which is used alone for braking operations below a specific braking torque threshold, and a second group which is used alone or in conjunction with the first group for braking operations above the threshold.

In this manner, the discs of the first group are subjected only to normal braking operations and therefore do not need to be oversized. The discs of the second group may be numerous in order to multiply the interfaces, but finer, since they are used only for high-intensity braking operations, which are rare and bring about only little wear. Only the discs of the first group are regularly changed as they become worn, the discs of the second group being able to last longer, even for the entire service-life of the aircraft, if they are used only for exceptional braking operations. Furthermore, the reduction of the number of frictional surfaces of the discs of the first group considerably extends the service-life thereof. This all enables a brake to be configured whose cost of use is much lower than that of a conventional brake.

DESCRIPTION OF THE FIGURES

The invention will be better understood in the light of the following description of different specific embodiments of the invention, with reference to the Figures of the appended drawings, in which.

DETAILED DESCRIPTION OF SPECIFIC EMBODIMENTS OF THE INVENTION

Figure 1:
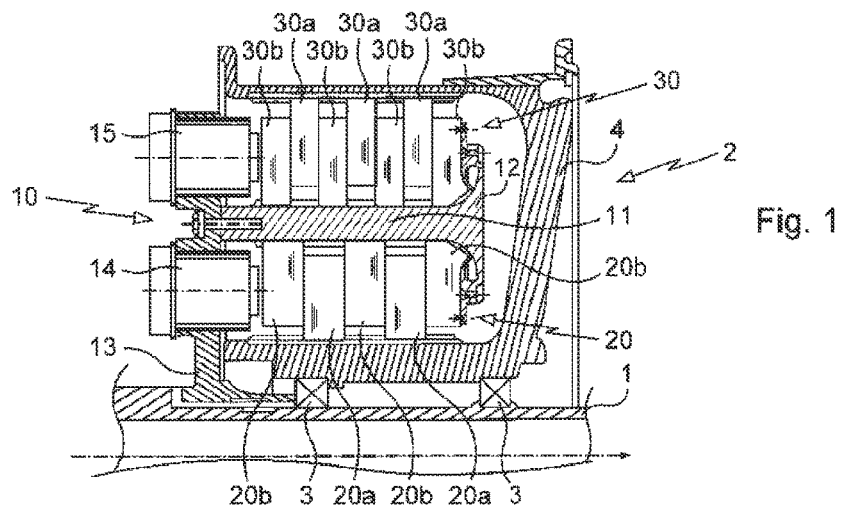
FIG. 1 is a schematic cross-section of a portion of an aircraft wheel brake according to the invention, illustrating a brake having two heat sinks in an arrangement referred to as "in parallel"

In FIG. 1, it is possible to see a landing gear axle 1 which carries a wheel 2 by means of roller bearings 3. The wheel 2 comprises a rim 4 which is intended to receive a tyre. According to a first embodiment of the invention, the wheel 2 is provided with a brake 10 comprising:
a structure which comprises a torsion tube 11 which is provided at the end thereof with a rear plate 12 and at the other end thereof with a support 13 which receives a first group of braking actuators 14 and a second group of actuators 15 which are arranged further away from the rotation axis of the wheel (only the actuators of each group in the plane of section are visible in this instance, but they are distributed over the entire circumference of the support). The structure which is centred on the axle is either fixed to the axle or prevented from rotating relative thereto during a braking action using a torque recovery bar, as is well known;
a first group of discs 20, which is called the first heat sink and which extends between the torsion tube and the rim, comprising rotor discs 20a which are compelled to rotate with the wheel 2 and stator discs 20b which are prevented from rotating relative to the torsion tube 11;
a second group of discs 30, which is called the second heat sink and which also extends between the torsion tube and the rim, but at the other side of the torsion tube 11, comprising rotor discs 30a which are compelled to rotate with the wheel 2 and stator discs 30b which are prevented from rotating relative to the torsion tube 11.

The two heat sinks 20 and 30 are therefore arranged concentrically, at one side and the other of the torsion tube. The actuators 14 of the first group are arranged so as to selectively apply a pressing force to the first heat sink 20, whilst the actuators 15 of the second group are arranged so as to selectively apply a force to the second heat sink.

The first heat sink 20 and the first group of actuators 14 are used to ensure the braking operations of normal intensity, such as the taxiing braking operations, and the landing braking operations, which are therefore lower than a specific braking torque threshold. In this regard, it should be noted that the discs are thick and therefore there are few of them. It is known that the taxiing braking operations, even if they do not require significant braking force, bring about an increase in the temperature of the discs, and are responsible for a large portion of the wear of a conventional brake. The use of a reduced number of thick discs for a specific heat sink length allows the service-life of this heat sink to be increased in proportion to the reduction of the number of frictional faces.

The second heat sink 30, which is arranged at the outer side of the first heat sink 20, and the second group of actuators 15 are used in order to ensure emergency braking operations of the type which may occur during an interrupted take-off at full thrust, which therefore require a significantly greater braking torque, but with less torque release than taxiing braking operations. They therefore wear the discs to a lesser extent. The second heat sink 30 thus comprises a larger number of discs in order to increase the number of braking interfaces, and therefore the braking torque, but with a smaller thickness, since they become much less worn. It should be noted that the second heat sink 30 is placed at the outer side of the first heat sink so that the braking torque is increased, for the same pressing force, as a result of the greater distance between the axis of the wheel and the point of application of the force of the actuators to the heat sink.

This distribution of the braking operations allows the use of two heat sinks which are each adapted to a specific use. The assembly, although more complex, requires much less maintenance and has a much longer service-life before replacement than in conventional brakes.

According to a specific aspect of the invention, the discs of the two heat sinks are produced from different materials: a friction material which is subjected to little wear and generates normal friction for the first heat sink 20, and a material which may be subjected to greater wear, but which generates greater friction for the second heat sink 30.

For high-intensity braking operations which exceed the torque threshold, as in situations of interrupted take-off in which a very significant braking torque is required, it is possible to size the second heat sink 30 so that it can by itself ensure this type of braking operation. Alternatively, it is possible to simultaneously use the two heat sinks 20, 30 by activating the two groups of actuators 14, 15 simultaneously. The resultant braking torque is the total of the braking torques generated by the two heat sinks. The two heat sinks are then used in parallel.

Figure 2A:
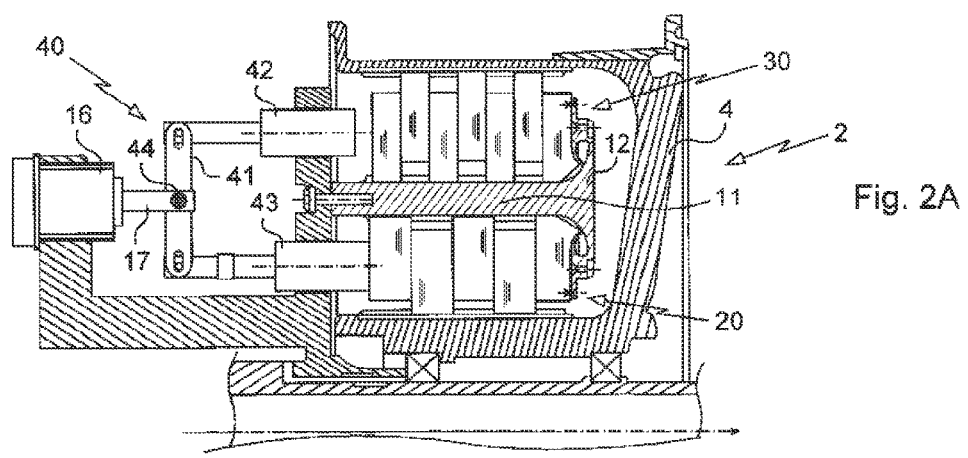
FIGS. 2A and 2B are Figures similar to FIG. 1, showing a production variant of a brake in a parallel arrangement.
Figure 2B:
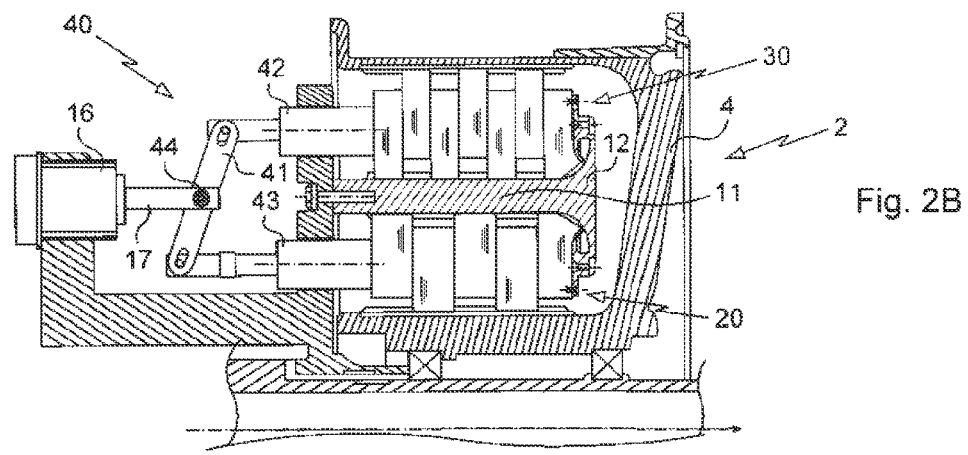

According to a variant illustrated in FIGS. 2A and 2B, the brake of the invention is always arranged in a parallel arrangement, but it now has only a single group of actuators 16. Each actuator 16 is associated with a force distribution member 40 which, as long as the braking force developed by the actuator does not exceed a predetermined threshold, applies the force of the actuator to the first heat sink 20 and, when the force requested exceeds the threshold, applies the force of the actuator to the two heat sinks 20, 30.

The force threshold is advantageously selected so that the first heat sink 20 ensures braking operations below the braking torque threshold, whilst the other braking operations are ensured by the use of the two heat sinks.

The distribution member comprises a rocker 41 which is articulated to the rod 17 of the actuator 16 and which actuates two pushing members 42, 43. The pushing member 43 is opposite the first heat sink 20, whilst the pushing member 42 is opposite the second heat sink 30. The rocker 41 is connected to the rod 17 of the actuator via a dynamometric mechanism 44 which maintains the rocker 41 in a square state as in FIG. 2A so that only the pushing member 43 can press on the opposing heat sink 20 as long as the force applied by the actuator 16 does not exceed a force threshold S. When the threshold is exceeded, the dynamometric mechanism 44 gives way, the rocker 41 is then free to pivot as illustrated in FIG. 2B and the two pushing members 42, 43 move into abutment with their respective heat sinks. The two heat sinks are then urged simultaneously. When the force is released, the dynamometric mechanism is rearmed in order to maintain the rocker in a square state again.

Figure 3:
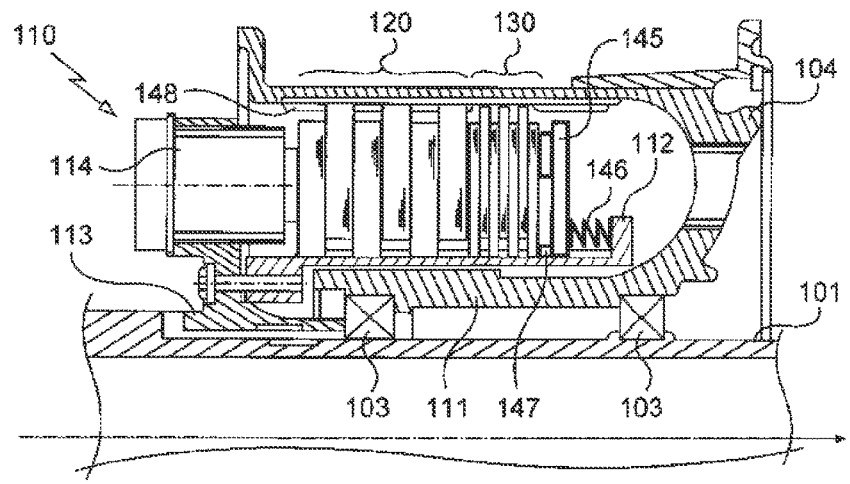
FIG. 3 is a schematic cross-section of a portion of a wheel brake according to the invention, illustrating a brake having two heat sinks in an arrangement referred to as "in series"
Figure 4:
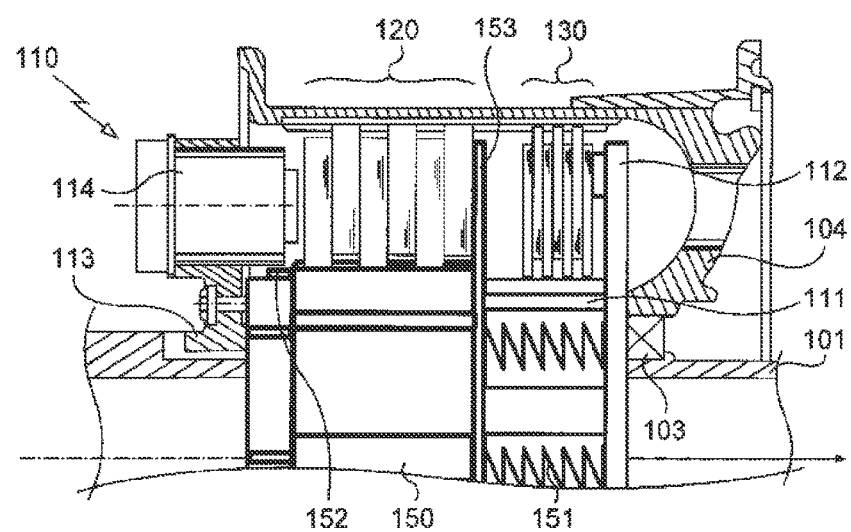
FIG. 4 is a Figure similar to FIG. 3, showing a production variant of a brake in a series arrangement.
Figure 5:
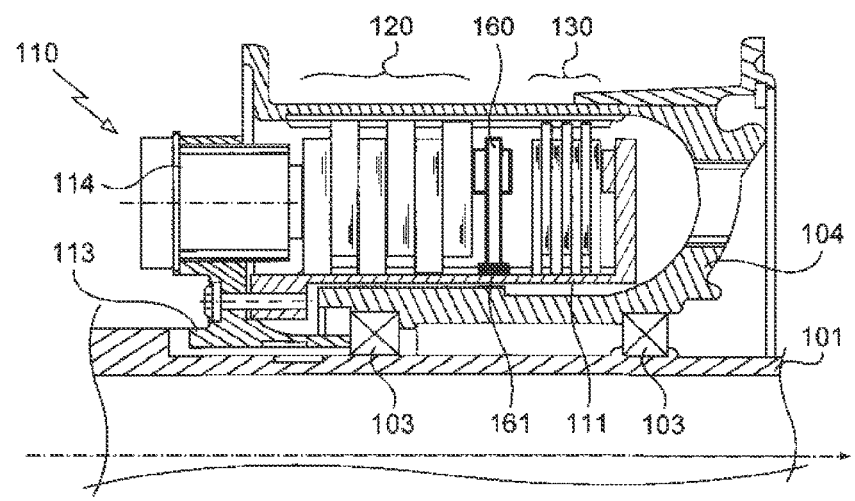
FIG. 5 is a Figure similar to FIG. 3 showing another production variant of a brake in a series arrangement.

According to a second embodiment of the invention illustrated in FIGS. 3 to 5, in which the reference numeral of the elements which are similar has been increased by a hundred, the two heat sinks 120 and 130 are now no longer arranged in parallel, but instead in series, one behind the other around the torsion tube 111, the first heat sink 120 being directly opposite the actuators 114. It should be noted that there is now only a single group of actuators 114.

In each of the embodiments illustrated, a distribution member allows only the first heat sink to be urged up to a predetermined force threshold of the actuators which corresponds to a braking torque threshold. When this threshold is exceeded, the distribution member allows the second heat sink to be urged in order to allow it to contribute to the generation of the braking torque.

In the first embodiment in series illustrated in FIG. 3, the two heat sinks are arranged directly one behind the other. The distribution member comprises an abutment plate 145 which is repelled by springs 146 towards a stop 147 which is interposed between the rear plate 112 and the second heat sink 130. The plate 145 can be repelled only when the force applied by the actuators 114 exceeds the threshold determined by the rigidity of the springs 146.

It should be noted that the bars 148 of the rim 104 which are used to rotatably drive the rotor discs of the two heat sinks 120, 130 are discontinuous. They have an interruption in the region of the second heat sink 130. In this manner, in conventional braking situations, only the first heat sink 120 can generate a braking torque. The second heat sink 130 receives the pressing force of the actuator, but since the rotor discs thereof are not rotatably driven by the bars 148, the second heat sink 130 does not generate any braking torque, and therefore does not become worn. If the actuator applies a force greater than the threshold, the two heat sinks recoil, repelling the plate 145 so that the rotor discs of the second heat sink 130 engage on the bars 148, and are consequently rotatably driven with the rim 104. The second heat sink 130 thus generates a braking torque, which is added to that generated by the first heat sink 120.

In the second embodiment in series illustrated in FIG. 4, the distribution member comprises a sheath 150 which is mounted in a sliding manner without rotation on the torsion tube 111 and which receives the first heat sink 120. The sheath 150 is repelled by springs 151 towards a stop 152. The sheath 150 carries an abutment plate 153 on which the first heat sink rests. In the rest state, a play is provided between the abutment plate 153 and the second heat sink 130. The sheath 150 can be repelled only when the force applied by the actuator 114 exceeds a specific threshold, determined by the rigidity of the springs 151.

As long as the force applied by the actuator 114 does not exceed the threshold, the sheath 150 does not move and only the first heat sink 120 is urged in order to generate a braking torque. When the force applied by the actuator 114 exceeds the threshold, the sheath 150 moves and is pressed against the second heat sink which, placed under pressure in such a manner, also generates a braking torque.

In the third embodiment in series illustrated in FIG. 5, the two heat sinks 120 and 130 are engaged on the torsion tube 111. The distribution member comprises a flexible plate 160 which is interposed between the two heat sinks 120, 130. The plate comprises a foot 161 which is anchored on the torsion tube in a frangible manner. In the rest state, a play is provided between the abutment plate 160 and the second heat sink 130. As long as the force applied by the actuator 114 is lower than a specific threshold, only the first heat sink 120 is urged and generates a braking torque. When the force applied exceeds the threshold, the anchoring of the foot 161 gives way and the plate 160 is released and moves into contact with the second heat sink, which is consequently urged and generates a braking torque.

In a variant, it is possible to provide a non-frangible anchoring, the plate 160 being provided in a flexible manner so as to move into contact with the second heat sink if the force applied by the actuators exceeds the threshold, so that the second heat sink contributes to the generation of the braking torque for braking operations beyond this threshold.

In the three embodiments in series, the distribution member allows a braking torque to be generated only by the first heat sink, up to a force threshold applied by the actuators. Beyond this threshold, the second heat sink is urged in order to generate a complementary braking torque which thus enables the generation of a greater total braking torque.

The invention is not limited to what has been described above, but instead includes any variant which is included within the scope defined by the claims. In particular, although it has been indicated that the second heat sink was used for landing braking operations and intense braking operations (interrupted take-off at full thrust), it is possible to select to urge the second heat sink only for these intense braking operations, using the first heat sink for taxiing braking operations and landing braking operations.

The invention claimed is:

1. A disk brake for an aircraft wheel, comprising:
   a plurality of friction discs (20,30; 120,130), including rotor discs and stator discs;
   a plurality of braking actuators (14,15,16; 114);
   a structure comprising a torsion tube (11; 111) on which the plurality of friction discs are fitted, a rear plate (12; 112) which is located at one end of the tube, and a support (13; 113) for the plurality of braking actuators at another end of the tube, each actuator in the plurality of actuators being activate able in order to selectively apply a pressing force to the plurality of discs;
   wherein the plurality of discs comprise two separate groups, including a first group of friction disks (20,120) which is pressed alone by said actuators for braking operations below a specific braking torque threshold, and a second group (30,130) of friction disks which is pressed alone or in conjunction with the first group of disks by said actuators for braking operations above said torque threshold.

2. The disk brake according to claim 1, in which the two groups of discs (20,30) extend at one side and the other of the torsion tube (11).

3. The disk brake according to claim 2, in which the plurality of braking actuators comprise two groups of actuators, the support (13) carries said two groups of actuators (14,15), each of the groups of actuators acting on one of the groups of discs.

4. The disk brake according to claim 2, in which the support (13) carries at least two actuators which are associated with a distribution member which, as long as the braking force developed by one of the at least two actuators does not exceed a specific threshold, applies the force of the one actuator to the first group of discs (20) and, when the force required exceeds the threshold, applies the force of the another of the at least two actuators to the two groups of discs.

5. The disk brake according to claim 1, in which the two groups of discs (120,130) are arranged one behind the other around the torsion tube (111).

6. The disk brake according to claim 5, which is provided with a distribution member which, up to a specific force threshold applied by the actuators (114), generates a braking torque by the first group of discs and, beyond the threshold, generates a braking torque by the two groups of discs.

7. The disk brake according to claim 5, in which the distribution member comprises an abutment plate (145) which is arranged behind the second group of discs and which is repelled towards a stop (147) by springs (146) which define a force threshold, and in which the rim is provided with bars (148) for rotatably driving the rotor discs which have a discontinuity in the region of the second group of discs so that, when the actuators apply a force which presses the two groups of discs below the threshold, only the rotor discs of the first group of discs are rotatably driven whilst, when the force of the actuators exceeds the threshold, the assembly of the two groups of discs recoils so that the rotor discs of the second group are rotatably driven by means of engagement on the bars.

8. The disk brake according to claim 5, in which the distribution member comprises a sheath (150) which is mounted so as to slide without any rotation on the torsion tube (111) and which carries the first group of discs (120), the sheath (150) being repelled by springs (151) towards a stop (152) and carrying an abutment plate (153) on which the first group of discs rests so that, as long as the force applied by the actuators (114) does not exceed a threshold determined by the springs, the sheath does not move and only the first group of discs is urged in order to generate a braking torque, and, when the force applied by the actuators exceeds this threshold, the sheath moves and is pushed against the second group of discs which, urged in this manner, also generates a braking torque.

9. The disk brake according to claim 5, in which the distribution member comprises an abutment plate (160) which is interposed between the groups of discs (120,130) and is anchored in a frangible manner on the torsion tube, so that the force applied by the actuators (114) is lower than a threshold, the abutment plate (160) does not touch the second group of discs (130) and only the first group of discs (120) is urged and generates a braking torque, whilst, when the force applied exceeds the threshold, the anchoring gives way and the abutment plate (160) is released in order to move into contact with the second group of discs which is consequently urged and also generates a braking torque.

10. The disk brake according to claim 5, in which the distribution member comprises a flexible abutment plate (160) which is interposed between the groups of discs (120,130) and is anchored on the torsion tube so that the force applied by the actuators (114) is lower than a threshold, the abutment plate (160) bends under the force but does not touch the second group of discs (130) and only the first group of discs (120) is urged and generates a braking torque, whilst, when the force applied exceeds the threshold, the abutment plate (160) bends sufficiently to move into contact with the second group of discs, which is consequently urged and also generates a braking torque.

* * * * *